(12) United States Patent
Robinson

(10) Patent No.: US 10,833,749 B1
(45) Date of Patent: Nov. 10, 2020

(54) COMMUNICATION SYSTEM AND METHOD USING LAYERED CONSTRUCTION OF ARBITRARY UNITARY MATRICES

(71) Applicant: Rampart Communications, Inc., Annapolis, MD (US)

(72) Inventor: Matthew Brandon Robinson, Crownsville, MD (US)

(73) Assignee: Rampart Communications, Inc., Annapolis, MD (US)

( * ) Notice: Subject to any disclaimer, the term of this patent is extended or adjusted under 35 U.S.C. 154(b) by 0 days.

(21) Appl. No.: 16/459,262

(22) Filed: Jul. 1, 2019

(51) Int. Cl.
*H04B 7/06* (2006.01)
*H04B 7/0413* (2017.01)
*H04L 5/00* (2006.01)

(52) U.S. Cl.
CPC ......... *H04B 7/0634* (2013.01); *H04B 7/0413* (2013.01); *H04L 5/0007* (2013.01)

(58) Field of Classification Search
CPC combination set(s) only.
See application file for complete search history.

(56) References Cited

U.S. PATENT DOCUMENTS

| | | | |
|---|---|---|---|
| 5,237,587 A | 8/1993 | Schoolcraft | |
| 5,345,599 A | 9/1994 | Paulraj et al. | |
| 5,555,268 A | 9/1996 | Fattouche et al. | |
| 6,389,138 B1 | 5/2002 | Li et al. | |
| 7,454,084 B2 * | 11/2008 | Faber | G06F 17/14 375/E7.045 |
| 9,648,444 B2 | 5/2017 | Agee | |
| 10,020,839 B2 | 7/2018 | Robinson et al. | |
| 10,491,262 B2 | 11/2019 | Robinson et al. | |
| 10,637,705 B1 * | 4/2020 | Shattil | H04W 72/0406 |
| 2003/0185309 A1 | 10/2003 | Pautler et al. | |
| 2003/0210750 A1 * | 11/2003 | Onggosanusi | H04L 25/0242 375/295 |

(Continued)

FOREIGN PATENT DOCUMENTS

| | | |
|---|---|---|
| EP | 1826915 A1 | 8/2007 |
| KR | 10-2010-0131373 A | 12/2010 |
| KR | 10-2013-0118525 A | 10/2013 |

OTHER PUBLICATIONS

International Search Report and Written Opinion for PCT Application No. PCT/US2017/061489, dated Feb. 26, 2018, 8 pages.

(Continued)

*Primary Examiner* — Kashif Siddiqui
(74) *Attorney, Agent, or Firm* — Cooley LLP

(57) ABSTRACT

A method includes generating, via a first processor of a first compute device, symbols based on an incoming data and decomposing a unitary matrix of size N×N by: 1) applying a permutation to each symbol using a permutation matrix, to produce permuted symbols, and 2) transforming each symbol using at least one primitive transformation matrix of size M×M, M being smaller than or equal to N, to produce transformed symbols. The method also includes sending a signal representing the transformed symbols to a plurality of transmitters for transmission of a signal representing the transformed symbols to a plurality of receivers. A signal representing the unitary matrix is sent to a second compute device for transmission of the unitary matrix to the receivers for recovery of the plurality of symbols at the plurality of receivers.

18 Claims, 5 Drawing Sheets

(56) References Cited

U.S. PATENT DOCUMENTS

| | | |
|---|---|---|
| 2004/0105489 A1 | 6/2004 | Kim et al. |
| 2006/0109897 A1 | 5/2006 | Guo et al. |
| 2006/0274825 A1 | 12/2006 | Ciofi et al. |
| 2009/0046801 A1 | 2/2009 | Pan et al. |
| 2010/0119001 A1 | 5/2010 | Walton et al. |
| 2010/0329393 A1* | 12/2010 | Higuchi ............ H04L 25/03216 375/340 |
| 2012/0093090 A1 | 4/2012 | Han et al. |
| 2013/0064315 A1 | 3/2013 | Heath, Jr. et al. |
| 2013/0100965 A1 | 4/2013 | Ohmi et al. |
| 2013/0223548 A1 | 8/2013 | Kang et al. |
| 2014/0056332 A1 | 2/2014 | Soualle et al. |
| 2015/0003500 A1 | 1/2015 | Kesling et al. |
| 2016/0309396 A1 | 10/2016 | Chai et al. |
| 2016/0337156 A1 | 11/2016 | Milleth et al. |
| 2017/0180020 A1 | 6/2017 | Namgoong et al. |
| 2017/0288902 A1* | 10/2017 | Rusek ............... H04M 1/72519 |
| 2017/0294946 A1 | 10/2017 | Wang et al. |
| 2017/0302415 A1 | 10/2017 | Park et al. |
| 2017/0331539 A1 | 11/2017 | Pham et al. |
| 2019/0075091 A1* | 3/2019 | Shattil .................. H04W 12/04 |
| 2019/0097694 A1 | 3/2019 | Jeon et al. |
| 2019/0158206 A1 | 5/2019 | Li et al. |
| 2019/0268035 A1 | 8/2019 | Robinson et al. |
| 2019/0349042 A1 | 11/2019 | Ramireddy et al. |
| 2019/0349045 A1 | 11/2019 | Varatharaajan et al. |
| 2019/0379430 A1 | 12/2019 | Pekoz et al. |

OTHER PUBLICATIONS

Wu et al., "Practical Physical Layer Security Schemes for MIMO-OFDM Systems Using Precoding Matrix Indices," IEEE Journal on Selected Areas in Communications, Sep. 2013, vol. 31, Issue 9, pp. 1687-1700.

\* cited by examiner

COMMUNICATION SYSTEM AND METHOD USING LAYERED CONSTRUCTION OF ARBITRARY UNITARY MATRICES

STATEMENT REGARDING FEDERAL GOVERNMENT INTEREST

This United States Government holds a nonexclusive, irrevocable, royalty-free license in the invention with power to grant licenses for all United States Government purposes.

CROSS-REFERENCE TO RELATED APPLICATIONS

This application is related to U.S. Non-Provisional patent application Ser. No. 16/416,144, filed on May 17, 2019 and titled "COMMUNICATION SYSTEM AND METHODS USING MULTIPLE-IN-MULTIPLE-OUT (MIMO) ANTENNAS WITHIN UNITARY BRAID DIVISIONAL MULTIPLEXING (UBDM)" and to U.S. Non-Provisional patent application Ser. No. 16/459,245, filed on Jul. 1, 2019 and titled "SYSTEMS, METHODS AND APPARATUS FOR SECURE AND EFFICIENT WIRELESS COMMUNICATION OF SIGNALS USING A GENERALIZED APPROACH WITHIN UNITARY BRAID DIVISION MULTIPLEXING," the disclosures of each of which are herein incorporated by reference in their entireties for all purposes.

TECHNICAL FIELD

The present invention relates generally to data communication, and more specifically to orthogonal frequency division multiplexing (OFDM) communication systems and techniques for providing OFDM symbol sizes to increase wireless efficiency.

BACKGROUND

Wireless communication systems are widely deployed to provide various types of communication services such as voice, packet data, and so on. These systems may utilize OFDM, which is a modulation technique capable of providing high performance for some wireless environments. OFDM effectively partitions the overall system bandwidth into a number of ($N_s$) orthogonal subbands, which are also commonly referred to as subcarriers, tones, bins, and frequency subchannels. With OFDM, each subband is associated with a respective carrier that may be modulated with data.

In OFDM, a stream of information bits is converted to a series of frequency-domain modulation symbols. One modulation symbol may be transmitted on each of the $N_s$ subbands in each OFDM symbol period (defined below). The modulation symbols to be transmitted on the $N_s$ subbands in each OFDM symbol period are transformed to the time-domain using an inverse fast Fourier transform (IFFT) to obtain a "transformed" symbol that contains $N_s$ samples. The input to an $N_s$-point IFFT is $N_s$ frequency-domain values and the output from the IFFT is $N_s$ time-domain samples. The number of subbands is determined by the size of the IFFT. Increasing the size of the IFFT increases the number of subbands and also increases the number of samples for each transformed symbol, which correspondingly increases the time required to transmit the symbol.

To combat frequency selective fading in the wireless channel used for data transmission (described below), a portion of each transformed symbol is typically repeated prior to transmission. The repeated portion is often referred to as a cyclic prefix, and has a length of $N_{cp}$ samples. The length of the cyclic prefix is typically selected based on the delay spread of the system, as described below, and is independent of the length of the transformed symbol. An OFDM symbol is composed of a transformed symbol and its cyclic prefix. Each OFDM symbol contains $N_s+N_{cp}$ samples and has a duration of $N_s+N_{cp}$ sample periods, which is one OFDM symbol period.

The size of the cyclic prefix relative to that of the OFDM symbol may have a large impact on the efficiency of an OFDM system. The cyclic prefix must be transmitted with each OFDM symbol to simplify the receiver processing in a multipath environment but carries no additional information. The cyclic prefix may be viewed as bandwidth that must be wasted as a price of operating in the multipath environment. The proportion of bandwidth wasted in this way can be computed using the formula $$\frac{N_{cp}}{N_s + N_{cp}}.$$

For example, if $N_{cp}$ is 16 samples and $N_s$ is 64 samples, then 20% of the bandwidth is lost to cyclic prefix overhead. This percentage may be decreased by using a relatively large value of $N_s$. Unfortunately, using a large value of $N_s$ can also lead to inefficiency, especially where the size of the information unit or packet to be transmitted is much smaller than the capacity of the OFDM symbol. For example, if each OFDM symbol can carry 480 information bits, but the most common packet contains 96 bits, then packing efficiency will be poor and much of the capacity of the OFDM symbol will be wasted when this common packet is sent.

Orthogonal frequency division multiple-access (OFDMA) can ameliorate the inefficiency due to excess capacity resulting from the use of a large OFDM symbol. For OFDMA, multiple users share the large OFDM symbol using frequency domain multiplexing. This is achieved by reserving a set of subbands for signaling and allocating different disjoint sets of subbands to different users. However, data transmission using OFDMA maybe complicated by various factors such as, for example, different power requirements, propagation delays, Doppler frequency shifts, and/or timing for different users sharing the large OFDM symbol.

Existing OFDM systems typically select a single OFDM symbol size that is a compromise of various objectives, which may include minimizing cyclic prefix overhead and maximizing packing efficiency. The use of this single OFDM symbol size results in inefficiency due to excess capacity when transmitting packets of varying sizes. There is therefore a need in the art for an OFDM system that operates efficiently when transmitting packets of varying sizes.

In multiple access communications, multiple user devices transmit signals over a given communications channel to a receiver. These signals are superimposed, forming a combined signal that propagates over that channel. The receiver then performs a separation operation on the combined signal to recover one or more individual signals from the combined signal. For example, each user device may be a cell phone belonging to a different user and the receiver may be a cell tower. By separating signals transmitted by different user devices, the different user devices may share the same communications channel without interference.

A transmitter may transmit different symbols by varying a state of a carrier or subcarrier, such as by varying an amplitude, phase and/or frequency of the carrier. Each symbol may represent one or more bits. These symbols can each be mapped to a discrete value in the complex plane, thus producing Quadrature Amplitude Modulation, or by assigning each symbol to a discrete frequency, producing Frequency Shift Keying. The symbols are then sampled at the Nyquist rate, which is at least twice the symbol transmission rate. The resulting signal is converted to analog through a digital to analog converter, and then translated up to the carrier frequency for transmission. When different user devices send symbols at the same time over the communications channel, the sine waves represented by those symbols are superimposed to form a combined signal that is received at the receiver.

SUMMARY

Techniques are provided herein to use OFDM symbols of different sizes to achieve greater efficiency for OFDM systems. These techniques can address both objectives of minimizing cyclic prefix overhead and maximizing packing efficiency. The OFDM symbol sizes may be selected based on the expected sizes of the different types of payload to be transmitted in an OFDM system. The system traffic may be arranged into different categories. For each category, one or more OFDM symbols of the proper sizes may be selected for use based on the expected payload size for the traffic in that category.

For example, the system traffic may be arranged into control data, user data, and pilot data. Control data may be transmitted using an OFDM symbol of a first size, user data may be transmitted using an OFDM symbol of a second size and the OFDM symbol of the first size, and pilot data may be transmitted using an OFDM symbol of a third size (or the first size). The user data may further be arranged into sub-categories such as, for example, voice data, packet data, messaging data, and so on. A particular OFDM symbol size may then be selected for each sub-category of user data. Alternatively or additionally, the data for each user may be transmitted using an OFDM symbol of a particular size selected for that user. For improved packing efficiency, OFDM symbols of different sizes may be used for a given user data packet to better match the capacity of the OFDM symbols to the packet payload.

In general, any number of OFDM symbol sizes may be used for an OFDM system, and any particular OFDM symbol size may be selected for use. In one illustrative design, a combination of two OFDM symbol sizes are used so as to maximize packing efficiency. In the illustrative design, a small or short OFDM symbol size (e.g., with 64 subbands) is used for pilot and control data. User data may be sent within zero or more OFDM symbols having a large or long OFDM symbol size (e.g., with 256 subbands) and zero or more OFDM symbols having the small OFDM symbol size, depending on the payload size.

The processing at a transmitter and receiver (e.g., encoding, interleaving, symbol mapping, and spatial processing) may be performed in a manner to account for the use of OFDM symbols of different sizes, as described below. Various aspects and embodiments of the invention are also described in further detail below.

An improved technique involves constructing arbitrary unitary matrices via a layered manner so as to obtain the set of orthogonal basis. In some embodiments, a method includes generating, via a first processor of a first compute device, a plurality of symbols based on an incoming data. The method also includes decomposing a unitary matrix of size N×N, N being a positive integer, by: 1) applying a permutation to each symbol from the plurality of symbols using a permutation matrix, to produce a permuted plurality of symbols, and 2) transforming each symbol from the permuted plurality of symbols using at least one primitive transformation matrix of size M×M, M being a positive integer having a value smaller than or equal to N, to produce a plurality of transformed symbols. The method further includes sending a signal representing the plurality of transformed symbols to a plurality of transmitters for transmission of a signal representing the plurality of transformed symbols from the plurality of transmitters to a plurality of receivers. A signal representing the unitary matrix is sent to a second compute device for transmission of the unitary matrix to the plurality of receivers prior to transmission of the signal representing the plurality of transformed symbols from the plurality of transmitters to the plurality of receivers, for recovery of the plurality of symbols at the plurality of receivers. As used herein, a "transmitter" (or "signal transmitter") refers to any collection of components that are used in the transmission of signals, including any combination of, but limited to, one or more: antennas, amplifiers, cables, digital-to-analog converters, filters, up-converters, processors (e.g., for reading bits and/or mapping of bits to a baseband), etc. Similarly, as used herein, a "receiver" (or "signal receiver") refers to any collection of components that are used in receiving signals, including any combination of, but limited to, one or more: antennas, amplifiers, cables, analog-to-digital converters, filters, down-converters, processors, etc.

In some embodiments, a system includes a plurality of signal receivers, a plurality of signal transmitters, and at least one processor operably coupled to the plurality of signal transmitters. The processor is configured to generate a plurality of symbols based on an incoming data and decompose a unitary transformation matrix of size N×N, N being a positive integer, into a set of layers. Each layer includes a permutation and at least one primitive transformation matrix of size M×M, M being a positive integer having a value smaller than or equal to N. The processor is also configured to encode each symbol from the plurality of symbols using at least one layer from the set of layers to produce a plurality of transformed symbols. The processor is further configured to send a signal representing the plurality of transformed symbols to a plurality of transmitters for transmission of a signal representing the plurality of transformed symbols from the plurality of transmitters to a plurality of signal receivers.

In some embodiments, a method includes generating, via a first processor of a first compute device, a plurality of symbols. The method also includes applying an arbitrary transformation of size N×N, N being a positive integer, to each symbol from the plurality of symbols to produce a plurality of transformed symbols. The arbitrary transformation includes an iterative process, each iteration of which includes: 1) a permutation followed by 2) an application of at least one primitive transformation matrix of size M×M, M being a positive integer having a value smaller than or equal to N. The method also includes sending a signal representing the plurality of transformed symbols to a plurality of transmitters for transmission of a signal representing the plurality of transformed symbols from the plurality of transmitters to a plurality of receivers. The method further includes sending a signal representing the arbitrary transformation to a second compute device for transmission of the arbitrary transformation to the plurality of signal receivers prior to transmission of the plurality of transformed symbols, for recovery of the plurality of symbols at the plurality of signal receivers.

The details of one or more implementations are set forth in the accompanying drawings and the description below. Other features will be apparent from the description and drawings, and from the claims.

DETAILED DESCRIPTION

As used herein, a receiver can be configured to receive transmissions from one, a subset of, or all (i.e., every) transmitting antenna. In embodiments where the receiver can receive the transmissions of (i.e., transmitted signals from) every transmitting antenna, the processing circuitry inside the receiver can be configured to take one or a variety of linear combinations of the received signals to extract the associated original data stream from each of the transmitting antennas. In some embodiments, each individual receiving antenna receives a transmission from all transmitting antennas, and processing circuitry is used to segregate the received signal transmissions into the individual transmitted signals.

Figure 1:
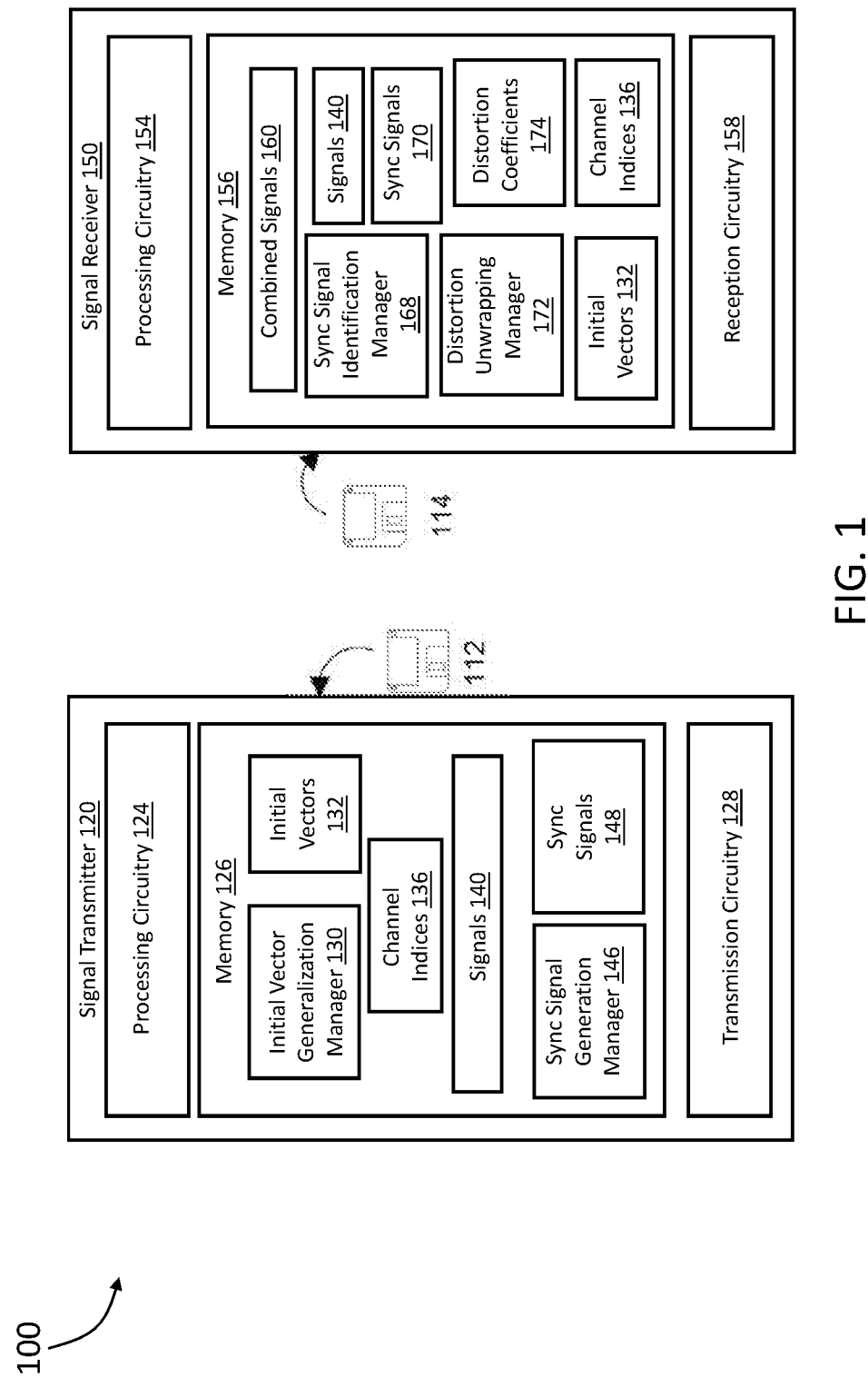
FIG. 1 is a block diagram illustrating an example electronic communications system within an electronic environment in which improved techniques described herein may be performed.

FIG. 1 is a diagram that illustrates an example system 100 in which improved techniques of transmitting wireless communications are performed. The system 100 includes a signal transmitter 120 and a signal receiver 150. It should be appreciated, however, that there may be other signal transmitters not pictured within the environment.

The signal transmitter 120 is configured to prepare signals for transmission to the signal receiver 150 and to transmit the prepared signals to the signal receiver 150. The signal transmitter 120 includes processing circuitry units 124, memory 126, and transmission circuitry unit 128. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein. The transmission circuitry 128 is configured to transmit signals in the form of radio-frequency energy to the receiver.

In some embodiments, one or more of the components of the signal transmitter 120 can be, or can include, processors (e.g., processing units 124) configured to process instructions stored in the memory 126. Examples of such instructions as depicted in FIG. 1 include an initial vector generation manager 130 and a sync signal generation manager 146. Further, as illustrated in FIG. 1, the memory 126 is configured to store various data, including initial vectors 132, channel indices 136, signals 140, and sync signals 148.

The initial vector generation manager 130 is configured to produce a set of initial vectors 132. As an example, in some implementations the initial vectors 132 are the rows of a K×N matrix. In this case, the initial vector generation manager 130 is configured to produce such a matrix based on a specification of the integer N, which represents a number of available discrete frequencies by which a signal may be modulated. These may be determined by the coherence bandwidth of the channel, which represents the multipath delay profile expected.

It should be appreciated that, while the initial vectors 132 provide a nearly orthogonal, or orthogonal, set of codes, the initial vectors 132 are not directly used to modulate these signals. Accordingly, a combined signal generated from the initial vectors 132 may not preserve orthogonality at the signal receiver 150 in the face of temporal delays between signal transmissions. In order to identify the channel distortion so that the original signals may be recovered at the signal receiver 150, the sync signal generation manager 146 is configured to generate sync signals 148 and to send the sync signals 148 to the signal receiver 150.

The sync signals 148 are training symbols used to deduce channel distortion coefficients. The signal receiver 150 may deduce these coefficients by comparing the distortion experienced by the sync signals 148 as received through the transmission channels to the original sync signals 148. In either case, the signal receiver 150 has a copy of the sync signals 148 stored locally. In some arrangements, the sync signal generation manager 146 prepends a sync signal 148 to a signal 140, for example to compensate for channel distortion.

The signal receiver 150 is configured to receive signals from the signal transmitter 120 and to perform operations on the received signals to recover the original signals 140. The signal receiver 150 includes processing circuitry 154, memory 156, and reception circuitry 158. The set of processing units 154 include one or more processing chips and/or assemblies. The memory 156 includes both volatile memory (e.g., RAM) and non-volatile memory, such as one or more ROMs, disk drives, solid state drives, and the like. The set of processing units 154 and the memory 156 together form control circuitry, which is configured and arranged to carry out various methods and functions as described herein. The reception circuitry 158 is configured to receive modulated signals in the form of radio-frequency energy from the signal transmitter 120.

In some embodiments, one or more of the components of the signal receiver 150 can be, or can include, processors (e.g., processing units 154) configured to process instructions stored in the memory 156. Examples of such instructions as depicted in FIG. 1 include a sync signal identification manager 168 and a distortion unwrapping manager 172. Further, as illustrated in FIG. 1, the memory 156 is configured to store various data, such as signals 140, sync signals 170, distortion coefficients 174, initial vectors 132 and channel indices 136.

In some implementations, the effects of channel distortion caused by multipath interference can be counteracted. This can be accomplished through design of the spacing of the discrete frequency components $\kappa_n$ to be such that they are less than the channel coherence bandwidth. Channel coherence bandwidth is typically the reciprocal of the Root Mean Square (RMS) delay spread of the channel, the delay spread being the distribution in time of the multipath delays.

Methods and systems described above usually involve a matrix operation on a vector. If the length of the vector is N and the size of the matrix is N×N (e.g., when the matrix is a unitary matrix), then the matrix operation on the vector involves $O(N^2)$ multiplications. Accordingly, as N increases, the computational burden on the telecommunication system can be prohibitive.

In some embodiments, some fast unitary transformations can be employed to reduce the calculation complexity. For example, the matrix operation on the vector can be achieved using Fourier matrix, Walsh-Hadamard matrix, Haar matrix, slant matrix, certain types of Toeplitz matrix, and certain types of circulant matrices that can be operated on a vector in a fast complexity class. These types of matrices, however, only form a limited class of transformations and therefore the resulting level of security may not be satisfactory.

To address the complexity issues while maintaining the security of the communication, systems and methods described herein employ an approach to build an arbitrary unitary matrix up from smaller matrices. In this approach, unitary matrices are built up in layers. Each layer includes two operations. The first operation is a permutation and the second operation is a direct sum of U(2) matrices. Permutation matrices are unitary matrices that do not require any floating point operations and therefore are computationally free, i.e., with O(1) complexity. U(2) matrices are matrices where most of the values are 0, except the 2×2 blocks along the diagonal (also referred to as block-U(2) matrices). These block-U(2) matrices involve only 4×N/2=2×N multiplications. As a result, a layer including a block-U(2) involves 2×N multiplications for the block-U(2) and no multiplications for the permutation. In other words, one layer during construction of a unitary matrix has complexity O(N).

The total complexity of constructing a unitary matrix is the product of the number of layers and O(N) that is the complexity of each layer. In some embodiments, the total number of layers can be log(N), and the total complexity of all of the layers is therefore O(N×log(N)), which is equivalent to the complexity of a standard OFDM. In addition, log(N) layers of block-U(2) and permutation matrices can produce a dense unitary. While the space of fast unitary matrices is not as large as the full space of unitary matrices, it can still be sufficiently large to make an attack by an eavesdropper prohibitive (see more details below with reference to FIG. 9).

In some embodiments, the approach described herein can employ block-U(m) matrices to build unitary matrices, where m is a positive integer (e.g., m=3, 4, 5, etc.). In some embodiments, matrices having different sizes can also be used within a single layer when constructing a unitary matrix. In some embodiments, different layers can use matrices having different sizes, e.g., a first layer uses block-U(m) matrices and a second layer uses block-U(l) matrices, where m is different from. For example, if N=8, a set of four 2×2 block-U(2) marices can be used in the first layer, followed by a permutation. Then two U(3) matrices and a single U(2) matrix can be used in the second layer, followed by another permutation. The third layer can include a block-U(2) matrix, a block-U(4) matrix, and then another block-U(2) matrix, followed by a third permutation.

In some embodiments, certain types of fast unitary matrices can also be written in terms of layers, each of which includes a permutation and a direct sum of blocks of smaller matrices. These types of matrices include, for example, Fourier matrices, Walsh-Hadamard matrices, Haar matrices, slant matrices, and Toeplitz matrices. In some embodiments, the unitary matrix that can be constructed using the layered approach includes any matrix that is not a direct sum of discrete Fourier matrices.

The layered approach described herein can be used in any situation that involves the construction of a unitary matrix. For example, the layered approach can be used by the initial vector generation manager 130 in the system 100 illustrated in FIG. 1 and described above.

Figure 2:
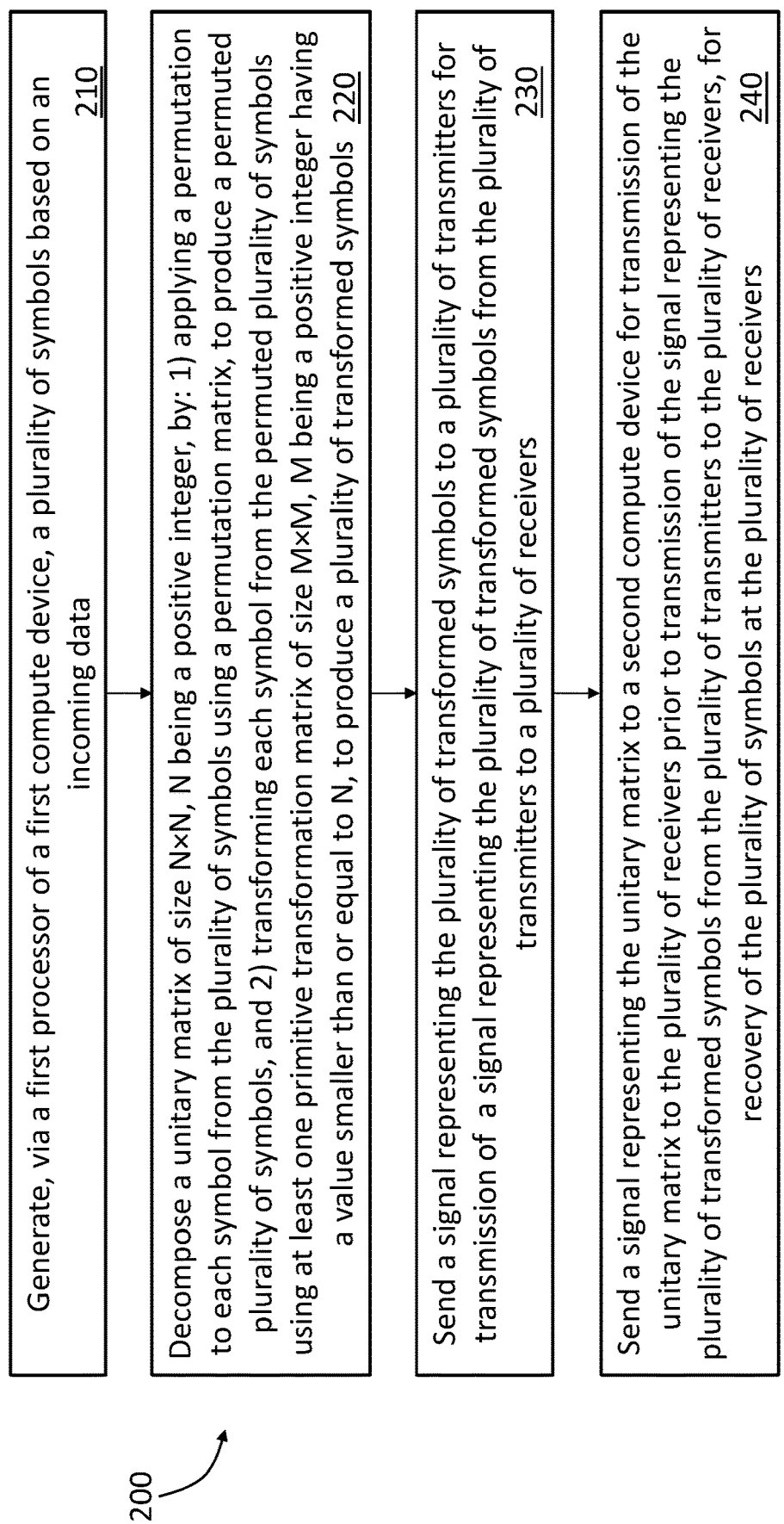
FIG. 2 is a flowchart illustrating a method of communication using a layered approach to build unitary matrices, according to an embodiment.

FIG. 2 is a flowchart illustrating a method 200 of communication including a layered approach to build unitary matrices, according to an embodiment. The method 200 includes, at 210, generating, via a first processor of a first compute device, a plurality of symbols based on an incoming data. At 220, a unitary matrix of size N×N is decomposed (where N is a positive integer). The decomposition includes: 1) applying a permutation to each symbol from the plurality of symbols using a permutation matrix, to produce a permuted plurality of symbols, and 2) transforming each symbol from the permuted plurality of symbols using at least one primitive transformation matrix of size M×M, where M is a positive integer having a value smaller than or equal to N. The result of step 2) is to produce a plurality of transformed symbols. In some embodiments, each primitive transformation matrix can include a block-U(M) matrix as described above.

The method 200 also includes, at 230, sending a signal representing the plurality of transformed symbols to a plurality of transmitters. The transmitters then transmit a signal representing the plurality of transformed symbols from the plurality of transmitters to a plurality of receivers. At 240, a signal representing the unitary matrix is sent to a second compute device for transmission of the unitary matrix to the plurality of receivers. In some embodiments, the unitary matrix can be transmitted to the receivers before the transmission of the signal representing the transformed symbols. The receivers can use the received unitary matrix for recovery of the symbols (i.e., symbols generated at 210).

In some embodiments, the decomposition of the unitary matrix at 220 can be achieved by multiple layers, each of which includes a permutation and a primitive transformation. For example, the first layer uses a first permutation matrix and a first primitive transformation matrix, and the second layer uses a second permutation matrix and a second primitive transformation matrix. In some embodiments, the total number of layers can be comparable to log(N), where N is the number of symbols generated at 210.

In some embodiments, the unitary matrix decomposed at 220 includes one of a Fourier matrix, a Walsh matrix, a Haar matrix, a slant matrix, or a Toeplitz matrix. In some embodiments, during the decomposition of the unitary matrix at 220, applying the permutation is not immediately followed by another permutation.

In some embodiments, the primitive transformation matrix has a dimension (e.g., a length) with a magnitude of 2, and the constructing the unitary matrix includes an iterative process that occurs $\log_2 N$ times. In some embodiments, other lengths can also be used for the primitive transformation matrix. For example, the primitive transformation matrix can have a length greater than 2 (e.g., 3, 4, 5, etc.). In some embodiments, the primitive transformation matrix includes a plurality of smaller matrices having diverse dimensions. For example, the primitive transformation matrix can include block-U(m) matrices, where m can be different values within a single layer or between different layers.

In some embodiments, the receiver used in the method 200 includes a plurality of antenna arrays (see, e.g., FIG. 10 and descriptions below). The plurality of receivers and the plurality of transmitters are configured to perform Multiple Input Multiple Output (MIMO) operations.

Figure 3:
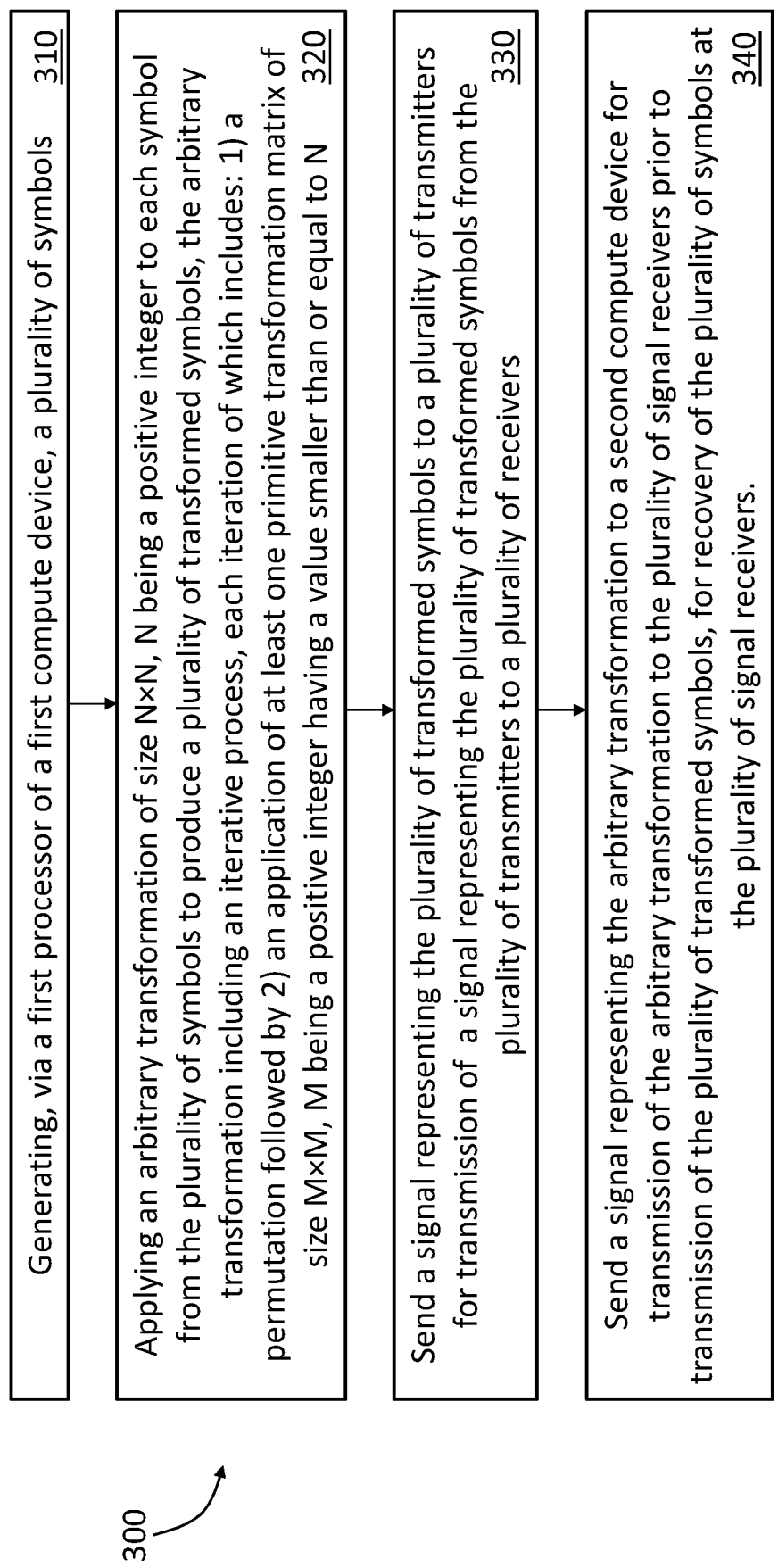
FIG. 3 is a flowchart illustrating a method of communication using a layered construction of an arbitrary matrix, according to an embodiment.

FIG. 3 is a flowchart illustrating a method 300 of communication using a layered construction of an arbitrary matrix, according to an embodiment. The method 300 includes, at 310, generating, via a first processor of a first compute device, a plurality of symbols. The method 300 also includes, at 320, applying an arbitrary transformation of size N×N to each symbol from the plurality of symbols to produce a plurality of transformed symbols, where N is a positive integer. The arbitrary transformation includes an iterative process (e.g., including multiple layers), and each iteration includes: 1) a permutation followed by 2) an application of at least one primitive transformation matrix of size M×M, where M is a positive integer having a value smaller than or equal to N.

At 330, a signal representing the plurality of transformed symbols is sent to a plurality of transmitters, which transmits a signal representing the plurality of transformed symbols to a plurality of receivers. The method 300 also includes, at 340, sending a signal representing the arbitrary transformation to a second compute device for transmission of the arbitrary transformation to the plurality of signal receivers prior to transmission of the plurality of transformed symbols, for recovery of the plurality of symbols at the plurality of signal receivers.

In some embodiments, the plurality of signal receivers includes a plurality of antenna arrays, and the plurality of signal receivers and the plurality of signal transmitters are configured to perform Multiple Input Multiple Output (MIMO) operations. In some embodiments, the arbitrary transformation includes a unitary transformation. In some embodiments, the arbitrary transformation includes one of a Fourier transform, a Walsh transform, a Haar transform, a slant transform, or a Toeplitz transform.

In some embodiments, each primitive transformation matrix from the at least one primitive transformation matrix has a dimension (e.g., a length) with a magnitude of 2, and a number of iterations of the iterative process is $\log_2 N$. In some embodiments, any other appropriate lengths can be used for the primitive transformation matrix. For example, the primitive transformation matrix can have a length greater than 2 (e.g., 3, 4, 5, etc.). In some embodiments, the primitive transformation matrix includes a plurality of smaller matrices having diverse dimensions. For example, the primitive transformation matrix can include block-U(m) matrices, where m can be different values within a single layer or between different layers.

The fast matrix operations in the methods 200 and 300 (e.g., 220 and 320) can be examined in more details with reference to Discrete Fourier Transform (DFT). Without being bound by any particular theory or mode of operation, the DFT of a vector $\bar{b}=(b_0, b_1, \ldots ; b_{N-1})$, denoted $\bar{B}$, with components $B_k$, can be given by:

$$B_k = \sum_{n=0}^{N-1} b_n w_N^{nk} \tag{18}$$

where $$\omega_N = e^{\frac{2\pi i}{N}}.$$

Generally, a DFT involves $N^2$ multiplies when carried out using naive matrix multiplication, as illustrated by Equation (18). The roots of unity $\omega_N$, however, have a set of symmetries that can reduce the number of multiplications. To this end, the sum in Equation (18) can be separated into even and odd terms, as (assuming for now that N is a multiple of 2):

$$B_k = \sum_{n=0}^{\frac{N}{2}-1} b_{2n} w_N^{2nk} + \sum_{n=0}^{\frac{N}{2}-1} b_{2n+1} w_N^{(2n+1)k} \tag{19}$$

$$= \sum_{n=0}^{\frac{N}{2}-1} b_{2n} w_N^{2nk} + w_N^k \sum_{n=0}^{\frac{N}{2}-1} b_{2n+1} w_N^{2nk}$$

In addition:

$$w_N^{2nk} = e^{\frac{2\pi i 2nk}{N}} = e^{\frac{2\pi i nk}{N/2}} = w_{N/2}^{nk} \tag{20}$$

So $B_k$ can be written a:

$$B_k \sum_{n=0}^{\frac{N}{2}-1} b_{2n} w_{N/2}^{nk} + w_N^k \sum_{n=0}^{\frac{N}{2}-1} b_{2n+1} w_{N/2}^{nk} \tag{21}$$

Now k runs over twice the range of n. But consider the follow equation;

$$w_{N/2}^{n\left(\frac{N}{2}+k\right)} = e^{\frac{2\pi i n\left(\frac{N}{2}+k\right)}{N/2}} = e^{2\pi i n} e^{\frac{2\pi i n k}{N/2}} = e^{\frac{2\pi i n k}{N/2}} \tag{22}$$

As a result, the "second half" of the k values in the N/2 point Fourier transform can be readily computed.

In DFT, the original sum to get $B_k$ involves N multiplications. The above analysis breaks the original sum into two sets of sums, each of which involves N/2 multiplications. Now the sums over n are from 0 to N/2−1, instead of being over the even or odds. This allows one to break them apart into even and odd terms again in exactly the same way as done above (assuming N/2 is also a multiple of 2). This results in four sums, each of which has N/4 terms.

Figure 4:
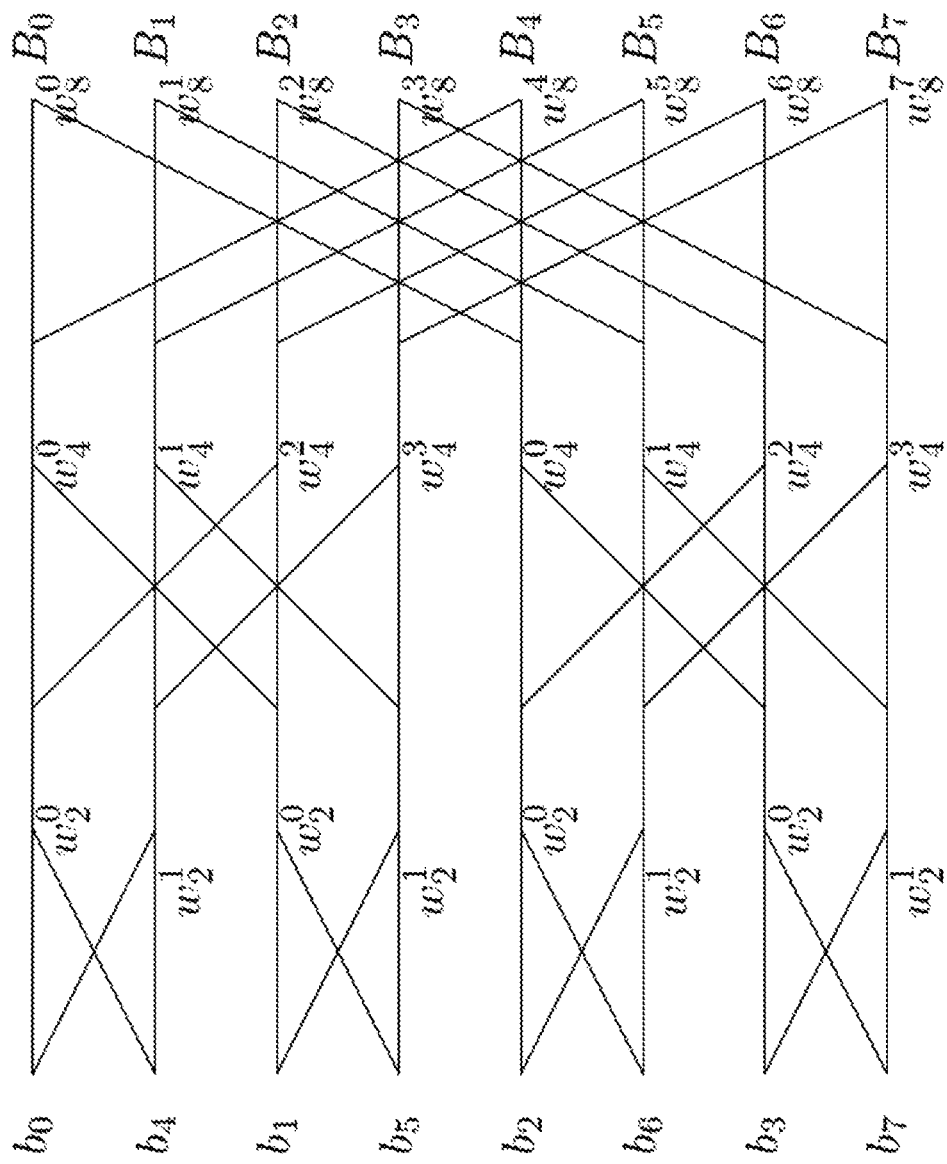
FIG. 4 is a diagram illustrating discrete Fourier Transform (DFT) of a vector $\bar{b}=(b_0, b_1, \ldots; b_{N-1})$.

If N is a power of 2, the break-down process can continue all the way down to 2 point DFT multiplications. FIG. 4 is a diagram illustrating discrete Fourier Transform (DFT) of a vector $\bar{b}=(b_0, b_1, \ldots ; b_{N-1})$. The N values are multiplied by the number on the lower incoming line to each node. At each of the three columns in FIG. 4, there are N multiplications, and the number of columns can be divided by 2 before reaching 2, i.e., log(N). Accordingly, the complexity of this DFT is O(N·log N).

The analysis above can be extended beyond the context of DFT as follows. First, a permutation is performed on incoming values in a vector to generate permutated vector. Permutations are usually O(1) operations. Then, a series of U(2) matrix multiplies is performed on the pairs of elements of the permuted vector. The U(2) values in the first column of the DFT example above are all:

$$\begin{pmatrix} 1 & 1 \\ 1 & -1 \end{pmatrix} \quad (23)$$

The U(2) matrix multiplication can be performed using other matrices as well (other than the one shown in (23)). For example, any matrix $A \in U(2) \oplus U(2) \oplus \ldots \oplus U(2)$ can be used, where $\oplus$ designates a direct sum, giving this matrix a block diagonal structure.

The combination of one permutation and one series of U(2) matrix multiplications can be regarded as one layer as described herein. The process can continue with additional layers, each of which includes one permutation and multiplications by yet another matrix in $U(2) \oplus \ldots \oplus U(2)$. In some embodiments, the layered computations can repeat for about log(N) times. In some embodiments, the number of layers can be any other values (e.g., within the available computational power).

The result of the above layered computations includes a matrix of the form:

$$A_{\log N} P_{\log N} \ldots A_2 P_2 A_1 P_1 \overline{b} \quad (24)$$

where $A_i$ represents the $i_{th}$ series of matrix multiplications and Pi represents the $i_{th}$ permutation in the $i_{th}$ layer.

Because permutations and the A matrices are all unitary, the inverse can also be readily computed. In the above layered computation, permutations are computationally free, and the computational cost is from the multiplications in the $A_i$ matrices. More specifically, the computation includes a total of 2N multiplications in each $A_i$, and there are log(N) of the $A_i$ matrices. Accordingly, the computation includes a total of 2N*log(N), or O(N*log(N)) operations, which are comparable to the complexity of OFDM.

The layered computation can be applied with any other block-U(m) matrices. For example, the $A_i$ matrix can be $A_i = U(3) \oplus \ldots \oplus U(3)$ or $A_i = U(4) \oplus \ldots \oplus U(4)$. Any other number of m can also be used. In addition, any combination of permutations and block-U(m) matrices can also be used in this layered computation allowable.

In some embodiments, the permutation and the block-U (m) transformation within one layer can be performed in a non-consecutive manner. For example, after the permutation, any other operations can be performed next before the block-U(m) transformation. In some embodiments, a permutation is not followed by another permutation because permutations are a closed subgroup of the unitary group. In some embodiments, a block-(m) transformation is not followed by another block-U(m) transformation because they also form a closed subgroup of the unitary group. In other words, denote $B_n$ as a block-U(n) and P as permutation, then operations like $PB_n \bullet\bullet PB_n PB_n \bullet B_n \overline{b}$ and $PB_n \bullet\bullet\bullet B_n \bullet\bullet B_n \bullet PB_n P\overline{b}$ can be performed. In contrast, operations like $PB_n PP\overline{b}$ and $B_n \bullet PB_n B_n \overline{b}$ can be redundant because two permutations or two block-U(m) transformations are consecutive here.

The layered approach to construct unitary matrices can also ensure the security of the resulting communication systems. The security of the resulting communication can depend on the size of the matrix space of fast unitary matrices compared to the full group U(N).

Figure 5:
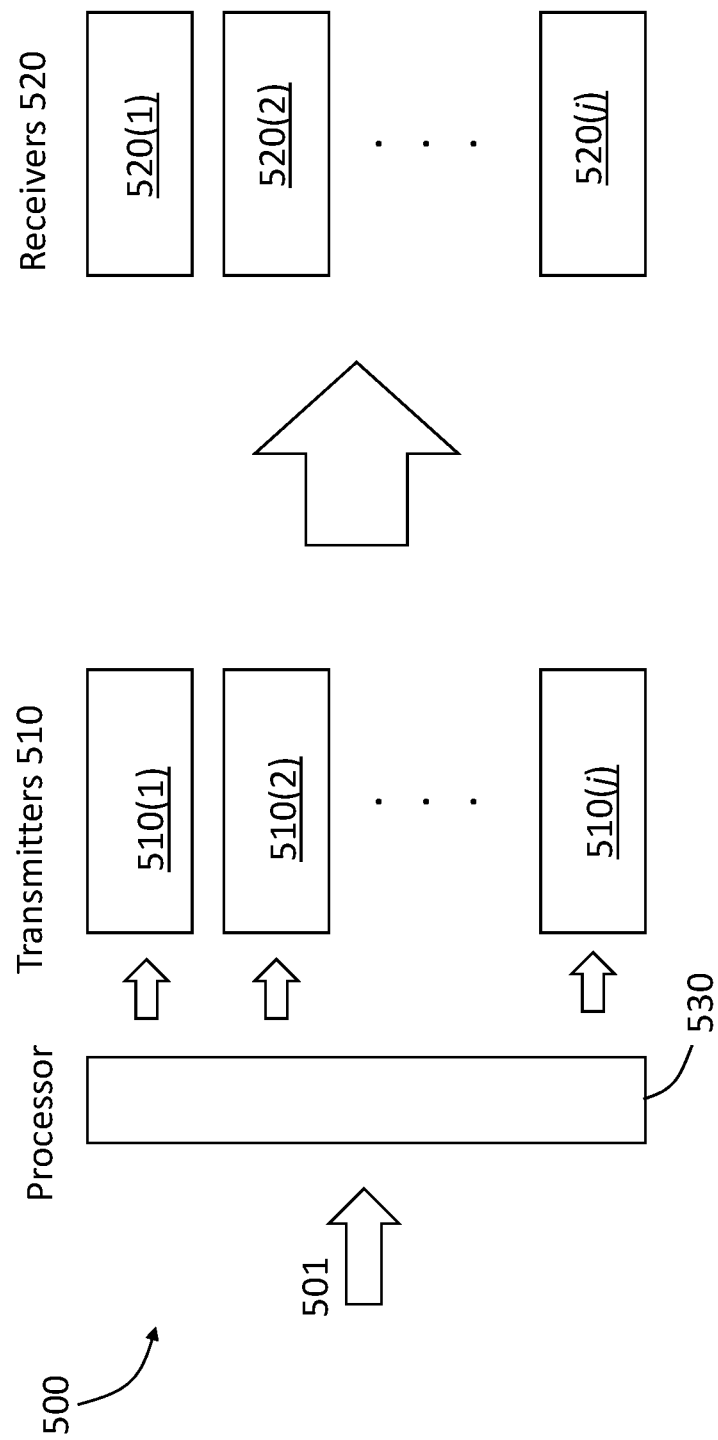
FIG. 5 is a schematic of a system for communication using layered construction of unitary matrices, according to an embodiment.

FIG. 5 is a schematic of a system 500 for communication using layered construction of unitary matrices, according to an embodiment. The system 500 includes a plurality of signal transmitters 510(1) to 510 (i) (collectively referred to as transmitters 510) and a plurality of signal receivers 520(1) to 520(j) (collectively referred to as receivers 520), where i and j are both positive integers. In some embodiments, i and j can equal. In some other embodiments, i can be different from j. In some embodiments, the transmitters 510 and the receivers 520 are configured to perform Multiple Input Multiple Output (MIMO) operations.

In some embodiments, the transmitters 510 can be substantially identical to the signal transmitter 120 illustrated in FIG. 1 and described above. In some embodiments, the receivers 520 can be substantially identical to the signal receiver 130 illustrated in FIG. 1 and described above. In some embodiments, each transmitter 510 includes an antenna and the transmitters 510 can form an antenna array. In some embodiments, each receiver includes an antenna and the receivers 520 can also form an antenna array.

The system 500 also includes a processor 530 operably coupled to the signal transmitters 510. In some embodiments, the processor 530 includes a single processor. In some embodiments, the processor 530 includes a group of processors. In some embodiments, the processor 530 can be included in one or more of the transmitters 510. In some embodiments, the processor 520 can be separate from the transmitters 510. For example, the processor 1030 can be included in a compute device configured to process the incoming data 501 and then direct the transmitters 510 to transmit signals representing the incoming data 501.

The processor 530 is configured to generate a plurality of symbols based on an incoming data 501 and decompose a unitary transformation matrix of size N×N into a set of layers, where N is a positive integer. Each layer includes a permutation and at least one primitive transformation matrix of size M×M, where M is a positive integer smaller than or equal to N.

The processor 530 is also configured to encode each symbol from the plurality of symbols using at least one layer from the set of layers to produce a plurality of transformed symbols. A signal representing the plurality of transformed symbols is then sent to the plurality of transmitters 510 for transmission to the plurality of signal receivers 520. In some embodiments, each transmitter in the transmitters 510 can communicate with any receiver in the receivers 520.

In some embodiments, the processor 530 is further configured to send a signal representing one of: (1) the unitary transformation matrix, or (2) an inverse of the unitary transformation matrix, to the receivers 520, prior to transmission of the signal representing the transformed symbols to the signal receivers 520. This signal can be used to by the signal receivers 520 to recover the symbols generated from the input data 501. In some embodiments, the unitary transformation matrix can be used for symbol recovery. In some embodiments, the recovery can be achieved by using the inverse of the unitary transformation matrix.

In some embodiments, the fast unitary transformation matrix includes one of a Fourier matrix, a Walsh matrix, a Haar matrix, a slant matrix, or a Toeplitz matrix. In some embodiments, the primitive transformation matrix has a dimension (e.g., a length) with a magnitude of 2 and the set of layers includes $\log_2 N$ layers. In some embodiments, any other length can be used as described above. In some embodiments, the signal receivers 120 are configured to transmit a signal representing the plurality of transformed symbols to a target device.

Implementations of the various techniques described herein may be implemented in digital electronic circuitry, or in computer hardware, firmware, software (executed or stored in hardware), or in combinations of them. Implementations may be implemented as a computer program product, i.e., a computer program tangibly embodied, e.g., in a machine-readable storage device (computer-readable medium, a non-transitory computer-readable storage medium, a tangible computer-readable storage medium, see for example, media 112 and 114 in FIG. 1), for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD or LED) monitor, a touchscreen display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
   generating, via a first processor of a first compute device, a plurality of symbols based on an incoming data;
   decomposing a unitary matrix of size N×N, N being a positive integer, by: 1) applying a permutation to each symbol from the plurality of symbols using a permutation matrix, to produce a permuted plurality of symbols, and 2) transforming each symbol from the permuted plurality of symbols using at least one primitive transformation matrix of size M×M, M being a positive integer having a value smaller than or equal N, to produce a plurality of transformed symbols;
   sending a signal representing the plurality of transformed symbols to a plurality of transmitters for transmission of a signal representing the plurality of transformed symbols from the plurality of transmitters to a plurality of receivers; and
   sending a signal representing the unitary matrix to a second compute device for transmission of the unitary matrix to the plurality of receivers prior to transmission of the signal representing the plurality of transformed symbols from the plurality of transmitters to the plurality of receivers, for recovery of the plurality of symbols at the plurality of receivers.

2. The method of claim 1, wherein the permutation matrix is a first permutation matrix and the at least one primitive transformation matrix is a first primitive transformation matrix, the constructing the unitary matrix further based on at least a second permutation matrix and a second primitive transformation matrix.

3. The method of claim 1, wherein the unitary matrix includes one of a Fourier matrix, a Walsh matrix, a Haar matrix, a slant matrix, or a Toeplitz matrix.

4. The method of claim 1, wherein the applying the permutation is not immediately followed by another permutation.

5. The method of claim 1, wherein the at least one primitive transformation matrix has a dimension having a magnitude of 2, and the constructing the unitary matrix includes an iterative process that occurs $\log_2 N$ times.

6. The method of claim 1, wherein the at least one primitive transformation matrix includes a plurality of primitive transformation matrices of diverse dimensions.

7. The method of claim 1, wherein the plurality of receivers includes a plurality of antenna arrays, the plurality of receivers and the plurality of transmitters configured to perform Multiple Input Multiple Output (MIMO) operations.

8. A system, comprising:
   a plurality of signal receivers;
   a plurality of signal transmitters; and at least one processor operably coupled to the plurality of signal transmitters, the at least one processor configured to:
generate a plurality of symbols based on an incoming data,
decompose a unitary transformation matrix of size N×N, N being a positive integer, into a set of layers, each layer including a permutation and at least one primitive transformation matrix of size M×M, M being a positive integer having a value smaller than or equal to N,
encode each symbol from the plurality of symbols using at least one layer from the set of layers to produce a plurality of transformed symbols, and
send a signal representing the plurality of transformed symbols to the plurality of transmitters for transmission of a signal representing the plurality of transformed symbols from the plurality of transmitters to the plurality of signal receivers.

9. The system of claim 8, wherein the at least one processor is further configured to send at least one signal representing each layer from the set of layers to the plurality of signal receivers prior to transmission of the signal representing the plurality of transformed symbols to the plurality of signal receivers, such that the plurality of signal receivers recovers the plurality of symbols from the plurality of transformed symbols based on the set of layers.

10. The system of claim 8, wherein the plurality of signal receivers includes a plurality of antenna arrays, the plurality of signal receivers and the plurality of signal transmitters configured to perform Multiple Input Multiple Output (MIMO) operations.

11. The system of claim 8, wherein the fast unitary transformation matrix includes one of a Fourier matrix, a Walsh matrix, a Haar matrix, a slant matrix, or a Toeplitz matrix.

12. The system of claim 8, wherein the at least one primitive transformation matrix has a dimension having a magnitude of 2 and the set of layers includes $\log_2 N$ layers.

13. The system of claim 8, wherein the plurality of signal receivers is configured to transmit a signal representing the plurality of transformed symbols to a target device.

14. A method, comprising:
generating, via a first processor of a first compute device, a plurality of symbols;
applying an arbitrary transformation of size N×N, N being a positive integer to each symbol from the plurality of symbols to produce a plurality of transformed symbols, the arbitrary transformation including an iterative process, each iteration of which includes: 1) a permutation followed by 2) an application of at least one primitive transformation matrix of size M×M, M being a positive integer having a value smaller than or equal to N;
sending a signal representing the plurality of transformed symbols to a plurality of transmitters for transmission of a signal representing the plurality of transformed symbols from the plurality of transmitters to a plurality of receivers; and
sending a signal representing the arbitrary transformation to a second compute device for transmission of the arbitrary transformation to the plurality of signal receivers prior to transmission of the plurality of transformed symbols, for recovery of the plurality of symbols at the plurality of signal receivers.

15. The method of claim 14, wherein the plurality of signal receivers includes a plurality of antenna arrays, the plurality of signal receivers and the plurality of signal transmitters configured to perform Multiple Input Multiple Output (MIMO) operations.

16. The method of claim 14, wherein the arbitrary transformation includes a unitary transformation.

17. The method of claim 14, wherein the arbitrary transformation includes one of a Fourier transform, a Walsh transform, a Haar transform, a slant transform, or a Toeplitz transform.

18. The method of claim 14, wherein each primitive transformation matrix from the at least one primitive transformation matrix has a dimension having magnitude of 2, and a number of iterations of the iterative process is $\log_2 N$.

* * * * *